June 26, 1956 R. A. FINDLAY 2,752,230
CRYSTAL PURIFICATION APPARATUS
Original Filed July 20, 1950
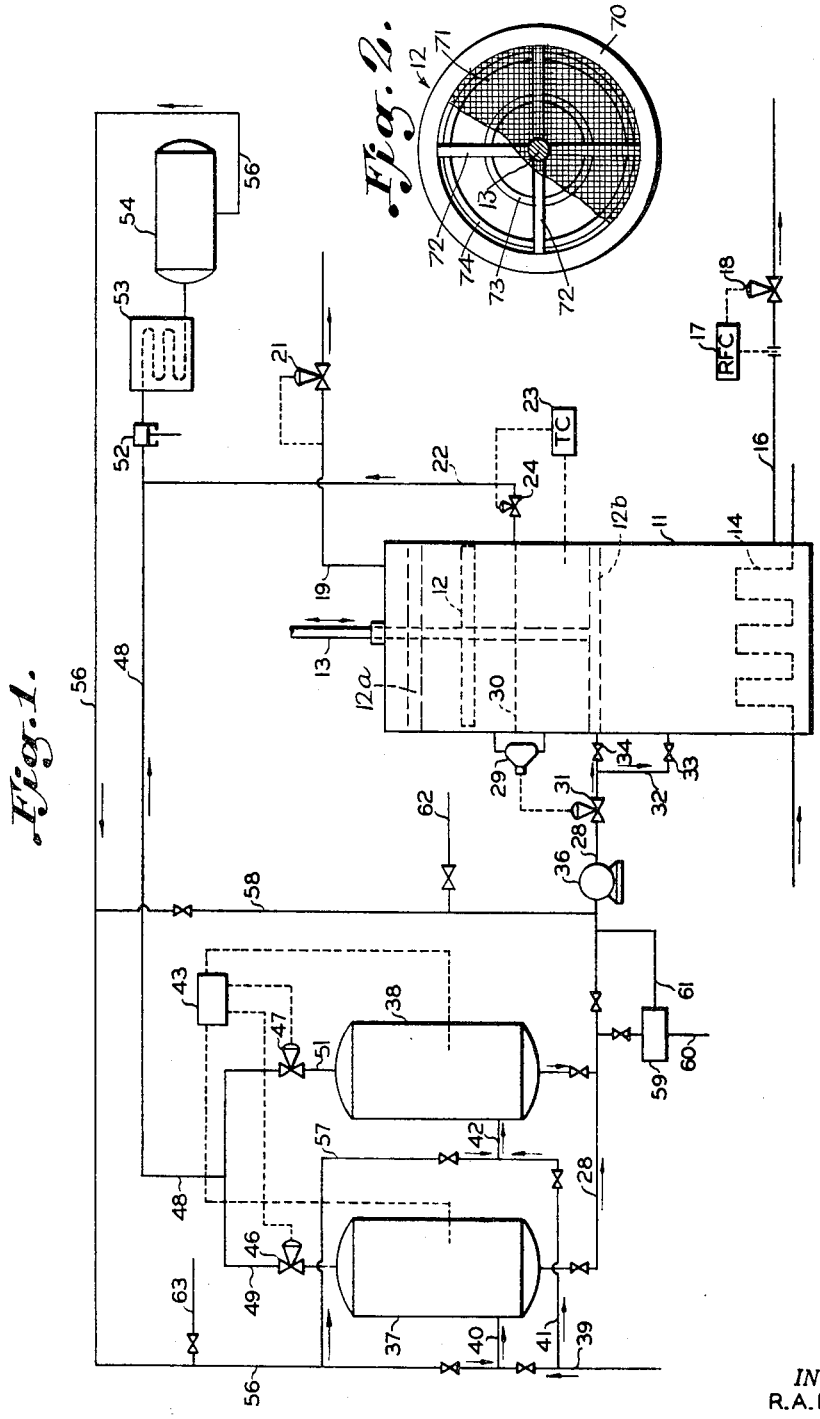
INVENTOR.
R. A. FINDLAY
BY
Hudson + Young
ATTORNEYS

United States Patent Office 2,752,230
Patented June 26, 1956

2,752,230
CRYSTAL PURIFICATION APPARATUS

Robert A. Findlay, Bartlesville, Okla., assignor to Phillips Petroleum Company, a corporation of Delaware Original application July 28, 1950, Serial No. 176,505. Divided and this application July 7, 1952, Serial No. 297,542

5 Claims. (Cl. 23—273)

This invention relates to apparatus for crystal separation and purification from liquid mixtures of organic compounds which are eutectic-forming. A specific aspect of the invention pertains to the purification of organic crystals containing occluded impurities.

This is a divisional application of application Serial No. 176,505 filed July 28, 1950, now Patent No. 2,683,178.

Separation of compounds may be effected by distillation, solvent extraction, and crystallization. Although distillation and extraction are generally preferred because of economy and convenience of operation, this is not always true. Many chemical isomers have similar boiling points and solubilities and can be separated only by crystallization. Separation by crystallization has one great advantage over other methods in that it is the only separation method which theoretically offers a pure product in a single stage of separation. Thus whereas distillation and extraction theoretically require infinite stages for a pure product, crystallization requires only one in separations of systems which do not form solid solutions. This is because of phase equilibrium in distillation and extraction but crystals separating from a solution are pure, regardless of liquid composition, the only impurity being occluded mother liquor within the crystal interstices. Thus whereas separation by distillation and extraction becomes more difficult as the purity of the product increases, separation by crystallization becomes easier.

Crystallization is thus well suited not only to separate many chemical isomers which can be separated by no other means but also to purify many compounds which cannot be economically purified by other means. Whereas one stage of crystallization theoretically offers a pure product, attainment of this ideal stage has been difficult. Complete removal of occluded impurities without loss in yield is required. U. S. patent application, Serial No. 166,992, describes such a process. This invention involves an improvement in the apparatus disclosed and claimed in that application.

In its broadest aspects, the improvement comprises introducing a readily vaporizable liquid refrigerant, together with the crystal feed, to the purification chamber, compressing the crystals to a compact mass or column in the bottom of the chamber while bypassing the liquid comprising the refrigerant, melting the lower end of the crystal column, removing only a portion of the melt from the bottom of the chamber so that the compression of the crystals forces the remainder of the melt upwardly as a reflux through the mass of crystals, and then reducing the pressure in the chamber sufficiently to vaporize at least a portion of the refrigerant and thereby freeze out the pure component in the reflux.

A principal object of the invention is to provide apparatus for separation and purification of components of liquid organic mixtures which effect high yields of pure product at high production rates. A further object of the invention is to improve the efficiency of a crystal purification process and apparatus. Other objects of the invention will become apparent from a consideration of the accompanying disclosure.

The apparatus of the invention effects the separation and purification of organic compounds of 99.9% purity with high and continuous yields. The process is applicable to binary and multi-component liquid organic mixtures which are eutectic-forming. The only systems to which it is not applicable are mixtures of compounds which form solid solutions. The process involves cooling the system from which the separation is to be made so as to form crystals of at least the higher melting component where the composition of the system is on that side of the eutectic favoring crystallization of the higher melting compound. The crystal component to be separated and purified may be frozen out by any suitable means such as in a low temperature freezing exchanger equipped with a scraping device for freeing the crystals from the walls of the exchanger or by auto-refrigeration from a mixture of the system with a suitable refrigerant. After formation of the crystals so as to produce a relatively thick slurry, the slurry, including sufficient refrigerant to freeze out a desired portion of the reflux hereinafter described, is fed to the crystal purification column or cylinder. In another modification, the crystals are separated from the mother liquor and mixed with a suitable amount of refrigerant to form a slurry which is then introduced to a purification column. The purification column is in the form of a vertical cylinder having a close-fitting porous liquid-pervious, crystal-impervious piston in the upper end thereof and a heat-exchange means in the lower end thereof. The feed is introduced at a point intermediate the ends of the column and below the level of the piston at the end of its downstroke, preferably just below the level of the piston at the end of its downstroke. A liquid level controller functions through a flow control valve in the feed line to maintain a relatively constant liquid level in the purification column, which level is suitably maintained intermediate the levels of the piston at its extreme positions. On the downstroke of the piston the liquid in the column passes through the porous piston because of its liquid pervious character and the crystals are compressed into a compact column or mass in the lower section of the cylinder. On the upstroke of the piston the liquid which has passed through the fine perforations in the piston is now lifted and forced out through an effluent line in the upper end of this cylinder.

By continuously melting the end of the compact column of crystals at the melting section of the column, withdrawing only a portion of the melt, and applying pressure to the opposite end of the column by crystals, the remaining portion of the melt is forced countercurrently to the movement of crystals in intimate contact therewith so as to remove the occluded impurities therefrom. It is believed that the high purity obtained is due at least in part to the forced washing action of the relatively pure melt passing through the column of crystals. It has been found that the purity of the crystals progressively increases from the piston end of the column to the melting section thereof as might be expected in this type of operation. The amount of reflux which is required to produce a melt of 99+% purity depends upon the physical and chemical characteristics of the crystals and the amount of occluded impurities therein. While it is preferred to maintain the amount of reflux in the range of 10 to 50% of the melt, it is feasible to operate with a reflux as low as 5% and as high as 60% in some instances.

On the upstroke of the piston a zone of decreased pressure is created as the piston passes the liquid level and a temperature controller device operates a flow control valve in a vaporous effluent line at the level of this zone of decreased pressure so as to permit vaporization of refrigerant from the liquid in the column and thereby reduce the temperature of said liquid so as to freeze out at least a portion of the higher melting component in the reflux liquid and leave the impurities washed out of the crystals in the mother liquor. These impurities then are withdrawn in the low melting liquid through the effluent line in the top of the cylinder on the upstroke of the piston. The temperature control device is sensitive to the temperature of the liquid in the cylinder at a level preferably just below the liquid level and operates a flow control valve on the vaporous refrigerant effluent line. It is found that this auto-refrigeration on the upstroke of the piston produces increased yield of higher melting pure component over the yield in a similar process in which no crystallization of reflux is effected.

The apparatus of the invention is applicable to the separation of a vast number of simple binary and complex multi-component systems. It is applicable to mixtures of compounds which have practically the same boiling point and also the same freezing point or to mixtures which have quite diverse boiling and freezing points. From a consideration of the phase diagram of a binary system which forms a eutectic it is obvious that either component (depending upon the location of the specific mixture on the diagram) may be separated by freezing until the concentration of the mother liquor reaches the approximate eutectic point. It is also apparent that effective separation of the components may be made from systems where the concentration of one component is relatively high, such as 97 or 98%, or where the concentrations of the components are about equal. One particularly advantageous application of the apparatus lies in the purification of a component of, say 95 to 98% purity so as to effect a purity upwards of 99.9%. In order to illustrate a few of the systems to which the invention is applicable, the following compounds are grouped with respect to their close boiling points:

Group A

| | B. P., °C. | F. P., °C. |
| --- | --- | --- |
| Benzine | 80 | 5.5 |
| n-hexane | 69 | −94 |
| n-heptane | 98.52 | −90.5 |
| Carbon tetrachloride | 77 | −22.8 |
| Acrylonitrile | 79 | −82 |
| Ethyl alcohol | 78.5 | −117.3 |
| 2,2-dimethylpentane | 79 | −125 |
| 3,3-dimethylpentane | 86 | |
| Methyl ethyl ketone | 79.6 | −86.4 |
| Methyl propionate | 79.9 | −87.5 |
| Methyl acrylate | 80.5 | |
| 1,3-cyclohexadiene | 80.5 | −98 |
| 2,4-dimethylpentane | 80.8 | −123.4 |
| 2,2,3-trimethylbutane | 80.9 | −25 |
| Cyclohexane | 81.4 | 6.5 |
| Acetonitrile | 82 | −42 |
| Cyclohexane | 83 | −103.7 |
| 2-methylhexane | 90 | −119 |
| 3-methylhexane | 89.4 | −119.4 |

Group B

| | B. P., °C. | F. P., °C. |
| --- | --- | --- |
| Methyl cyclohexane | 100.3 | −126.3 |
| Cyclohexane | 81.4 | 6.5 |
| n-heptane | 98.52 | −90.5 |
| 2,2,4-trimethylpentane (isooctane) | 99.3 | −107.4 |
| Nitromethane | 101 | −29 |
| p-dioxane | 101.5 | 11.7 |
| 2-pentanone | 101.7 | −77.8 |
| 2-methyl-2-butano | 101.8 | −11.9 |
| 2,3-dimethylpentane | 89.4 | |
| 3-ethylpentane | 93.3 | −94.5 |

Group C

| | B. P., °C. | F. P., °C. |
| --- | --- | --- |
| Toluene | 110.8 | −95 |
| Methylcyclohexane | 100.3 | −126.3 |
| 2,2,3,3-tetramethyl butane | 106.8 | 104 |
| 2,5-dimethylhexane | 108.25 | −91 |
| 2,4-dimethylhexane | 110 | |
| 2,3-dimethylhexane | 113.9 | |
| 3,4-dimethylhexane | 116.5 | |
| 3-ethyl-2-methylpentane | 114 | |
| 3-ethyl-3-methylpentane | 119 | |

Group D

| | B. P., °C. | F. P., °C. |
| --- | --- | --- |
| Aniline | 184.4 | −6.2 |
| Toluene | 110.8 | −95 |
| Benzene | 80.0 | 5.5 |

Group E

| | B. P., °C. | F. P., °C. |
| --- | --- | --- |
| Carbon tetrachloride | 77 | −22.8 |
| Chloroform | 61 | −63.5 |
| $CS_2$ | 46.3 | −108.6 |
| Acetone | 56.5 | −95 |

Group F

| | B. P., °C. | F. P., °C. |
| --- | --- | --- |
| Ortho-xylene | 144 | −27.1 |
| Meta-xylene | 138.8 | −47.4 |
| Para-xylene | 138.5 | 13.2 |

Group G

| | B. P., °C. | F. P., °C. |
| --- | --- | --- |
| Ortho-cymene | 175.0 | −73.5 |
| Meta-cymene | 175.7 | −25 |
| Para-cymene | 176.0 | −73.5 |

Group H

| | B. P., °C. | F. P., °C. |
| --- | --- | --- |
| Nitro-toluene: | | |
| Ortho- | 232.6 | −9.27 |
| Meta- | 232.6 | 16.10 |
| Para- | 238.4 | 51.6 |

Systems consisting of combinations of two or more of the components within any one of the groups may be separated by the process of the invention as well as systems made up of components from different groups; for example, benzene may be separated from a benzene-n-hexane or n-heptane system in which the benzene is present in an amount greater than the eutectic concentration. In the same manner, para-xylene may be readily separated from a mixture of para- and meta-xylenes or from para-, meta-, and ortho-xylenes. Benzene may also be separated from a mixture with toluene and/or aniline. Multi-component systems which may be effectively separated so as to recover one or more of the components in substantially pure form include 2,2-dimethylpentane, 2,4-dimethylpentane, 2,2,3-trimethylbutane; methyl cyclohexane, 2,2,4-trimethylpentane; and carbon tetrachloride, chloroform, acetone. The invention is also applicable to the separation of individual components from a system of cymenes and a system including the xylenes. The nitro-toluenes and particularly para-nitro-toluene may be separated by the process of the invention from a system of two or more of the nitro-toluenes.

It should be understood that many so-called binary systems also include small percentages of one or more other compounds as impurities which may be practically disregarded as far as operation of the process is concerned since they do not freeze out with the crystals but are retained in the mother liquor. So, in reality, most binary systems are multi-component systems in which one or more components are present in minor amounts not materially changing the separation from that in a true binary system.

The refrigerant selected for the process as applied to a particular system should be miscible with the liquid of the slurry and non-reactive or inert with respect to the mother liquor and the crystals. The refrigerant should also be selected in accordance with the required temperature of operation for separation and purification of a compound from any given system. Any of the conventional readily vaporizable liquid refrigerants may be used with specific systems to which they are applicable. These refrigerants include Freon, ammonia, normally gaseous hydrocarbons including ethane, ethylene, propane, propylene, butane, butylenes, ether, acetone, and numerous other readily vaporizable liquids.

For a more complete comprehension of the invention, reference may be had to the drawing of which Figure 1 is a diagrammatic showing of an elevational view of one modification of the apparatus of the invention; and Figure 2 is a diagrammatic plan view with a cut-away section showing one embodiment of a porous piston. Reference numeral 11 designates a vertically elongated crystal purification column in cylindrical form having a reciprocable piston 12 in the upper end thereof operated by piston rod 13 which may be driven by any suitable motive device, not shown.

Piston 12 closely fits the walls of the column or cylinder. A piston ring (not shown) on piston 12 may be utilized to obtain close fitting cooperation between the piston and the cylinder. The extreme positions of piston 12 are shown as 12a and 12b. Piston 12 is faced with a screen of preferably 30-mesh or finer. In operating with systems in which the crystals are unusually fine, it is usually desirable to cover a 30-mesh screen with a filter cloth of suitable material. In operating with some systems, good results may be obtained by utilizing a screen of brass or other non-corrodable material of 150 to 325-mesh fineness without the aid of an additional filtering means.

A heat-exchange coil 14 in the bottom of cylinder 11 functions to maintain a melt of the component being purified in the bottom of the purification zone. This heat-exchange element may be of any conventional type. A product effluent line 16 serves to withdraw melted product from the bottom of the column at a rate controlled by rate of flow controller 17 connected with line 16 and motor valve 18. Effluent line 19, connecting with the upper end of column 11, serves to withdraw mother liquor and refrigerant from the area above piston 12 on the upstroke. Pressure control valve 21 is operated to maintain a relatively small pressure such as one pound p. s. i. g. in line 19 so as to back-wash the filter screen in piston 12.

Line 22 connects with the interior of column 11 along the path of the piston and serves to withdraw vaporized refrigerant during the upstroke of the piston under the control of temperature controller 23 through valve 24. Temperature controller 23 is sensitive to the temperature of the liquid in column 11 just below the liquid level.

Liquid level controller 29 maintains a liquid level at line 30 in column 11 intermediate the extreme piston positions through control of valve 31 in feed line 28. The feed in the form of a slurry of crystals and mother liquor and/or refrigerant is passed into column 11 at a suitable level directly through line 28 under the control of valve 34 or through branch line 32 controlled by valve 33. The level of introduction of the feed should be above the melt section of the column and preferably below the piston at the end of its downstroke. However, it is obvious that feed line 28 and/or 32 should not enter column 11 above the skirt of the piston at its lowermost position in order to avoid introducing crystals to the column above the piston where they would not be available for compaction and purification. Pump 36 operates to deliver feed to column 11 from any suitable source, such as refrigeration tanks 37 and 38, which operate alternately onstream and on crystallization, batchwise by auto-refrigeration. Line 39 serves to admit any multi-component or binary system of organic liquids which form eutectics to tanks 37 and 38 through lines 40, 41, and 42. A suitable refrigerant is admitted with the feed passing through lines 40 and 42 by means of lines 56 and 57. A temperature cycle control system comprising timer-controller element 43, valves 46 and 47 in lines 49 and 51, respectively, with which it is connected, operates so as to effect slow crystallization of the desirable component from the feed admitted to tanks 37 and 38 on alternate cycles of crystallization and onstream to purification column 11.

A compressor 52 in line 48 compresses the refrigerant from lines 48 and 22 and the liquefied refrigerant is then passed to heat-exchanger or cooler 53 from which the cooled liquid refrigerant is then passed to storage tank 54 and returned via line 56 either to the crystallizers 37 or 38 or through line 58 directly to the feed line 28. The liquefied refrigerant is passed through line 58 directly into feed line 28 when the crystallization is effected in the absence of the refrigerant in the crystallization tanks or when insufficient refrigerant is present in the crystal slurry from the crystallizers passing through line 28.

Filter 59 is utilized to filter the crystals from the mother liquor, in accordance with one modification of the invention, the mother liquor passing to any suitable treatment through line 60 and the crystals passing through line 61 to line 28. In this modification the refrigerant is mixed with the crystals to form a slurry after they leave the filter such as by introduction of refrigerant through line 58. The slurry then passes through line 28 into purification column 11. Additional or fresh refrigerant may be admitted to the system through line 62 connecting with line 58 or through line 63 connecting with line 56.

Figure 2 shows piston 12 comprising a shell 70, the forward end of which is partially covered by a screen 71 which is supported by a framework comprising cross members 72 and arcuate members 73. The circumference of the screen is supported by a shoulder 74 formed by a rabbet or groove in the forward end of piston 12.

Various modifications of the invention may be practiced in the apparatus and with the equipment shown in the drawing. For purposes of illustration, a feed stream of xylenes consisting of meta- and para-xylene, utilizing as the refrigerant liquefied ethane, will be described. The xylenes are passed through lines 39, 40, 41, and 42 admixed with ethane admitted through lines 56 and 57 into crystallizers 37 and 38. Temperature cycle control device 43 is operated to slowly crystallize para-xylene from the feed in crystallizer 37 and while this batch comprising a thick slurry of the crystals in mother liquor and sufficient refrigerant to freeze out additional para-xylene from the reflux hereinafter described is passed via line 28 under the impetus of pump 36 into purification column 11, device 43 operates valve 47 in response to the temperature in crystallizer 38 so as to gradually and slowly vaporize ethane from the batch of feed in the crystallizer and thereby slowly effect the crystallization of para-xylene from the feed therein.

When the level of the crystal slurry in column 11 reaches the level of line 30, piston 12 is forced downwardly so that the crystals in the slurry are compressed downwardly and mother liquor passes through the porous piston and upon repetition of this compression stroke a compact column of crystals is formed in the lower end of the cylinder. On each upstroke the flow controller 29 functions to admit fresh feed through line 28 and valves 31 and 34 so as to maintain a predetermined liquid level in the column. As the piston rises, part of the liquid above the piston is forced out through line 19 and an area of decreased pressure is formed directly below the piston and above the liquid level so that ethane in the feed is vaporized, thereby reducing the temperature in the upper end of the liquid column under the control of instrument 23 so as to freeze out para-xylene in the reflux which will now be described.

Heat is supplied by means of heat-exchanger 14 in the bottom of the cylinder so as to form a melt of the para-xylene crystals therein. A portion of this melt in the range of 40 to 95%, preferably 50%, is withdrawn through line 16 under the control of rate-of-flow controller 17 actuating valve 18. This means that on the compression stroke, as crystals are forced into the lower end of cylinder 11, a substantial portion of the melt is forced upwardly through the column of crystals so as to exert an efficient washing action thereon and remove occluded impurities from the crystals. It has been found that the crystals approaching the melt are of a purity greater than 99% when a substantial portion of the melt is refluxed therethrough. As reflux melt approaches the region just below liquid level 30, a substantial portion of the para-xylene is recrystallized due to the auto-refrigeration of the system effected by vaporization of ethane in the region of liquid level 30.

The vaporized ethane is withdrawn through valve 24 under the control of temperature controller 23 which is sensitive to the temperature of the purification column just below liquid level 30 and actuates valve 24 so as to maintain a predetermined temperature in the upper part of the liquid column. The vaporized ethane is compressed by compressor 52, cooled by cooler 53, and stored in tank 54 for recycle to the system.

The effluent taken off through line 19 consists primarily of metaxylene. The small proportion of refrigerant in this effluent can be recovered by vaporization.

The flow of liquid into line 22 on the initial phase of the piston upstroke may be prevented by operation of a second valve in line 22 adjacent column 11, which valve is synchronized with the movement of piston 12 by suitable means so as to open only when piston 12 is above the level of the opening of line 22 into the column.

In the case of a binary feed the low melting effluent taken off through line 19 will ordinarily have a composition approximating that of the binary eutectic. However, if desired, the system may be operated in such a way that this liquid is richer than the binary eutectic in the low melting component and after recovery of the propane this liquid may then be processed separately to crystallize and recover the low melting component in pure form.

EXAMPLE

A feed stream consisting essentially of meta- and para-xylene in equal parts by weight, at a temperature of 80° F., is admixed with ethane at a temperature of —6° F. in an insulated vessel adapted to permit the formation of a slurry upon the evaporation of a portion of the ethane. A resulting slurry, comprising crystalline para-xylene, liquid meta- and para-xylenes, and ethane, is passed at —60° F. to a crystal purification column like column 11 of the drawing, operating at a pressure of 16 p. s. i. a. The column and its associated equipment are operated in the manner described above, to produce a high-melting product stream comprising 99.5 weight per cent para-xylene and 0.5 weight per cent meta-xylene. A low melting product stream (the mother liquor removed from the top of the crystal purification column) is passed to a fractional distillation zone for the removal of ethane. The thus recovered meta-xylene concentrate contains 90 weight per cent metaxylene and 10 weight per cent para-xylene.

The illustrative details set forth herein are not to be construed as imposing unnecessary limitations upon the invention, the scope of which is set forth in the claims.

I claim:

1. Apparatus for the purification of discrete organic crystals containing occluded impurities comprising in combination an upright elongated closed cylinder; heating means communicating with the lower end of said cylinder adapted for melting and maintaining a melt of crystals therein; a reciprocable finely-perforate, liquid-pervious, crystal-impervious, close-fitting piston in the upper end of said cylinder adapted for compressing crystals from a slurry into the lower end of said cylinder while permitting liquid to pass through the piston; a feed line opening into said cylinder at a point below said piston at the end of the compression stroke; a liquid-level controller communicating with a valve in said feed line and with an area of said cylinder intermediate the extreme piston positions; a liquid take-off line opening into the upper section of said cylinder above said piston at the end of the upstroke; a vapor take-off line opening into said cylinder at a level just above the liquid level control level; a pressure control valve in said liquid take-off line; a flow control valve in said vapor take-off line; a temperature control element in communication with said flow control valve and with the interior of said cylinder just below the level of said liquid control level; and a liquid effluent line opening into the lower end of said cylinder.

2. Apparatus for the purification of solid material containing occluded impurities comprising in combination an upright elongated closed column; a heating and melting section in the lower end of said column for melting solid material therein; a feed line leading into said column below the hereinafter-named liquid level and above said heating and melting section adapted for introducing a slurry of discrete solid thereto; a liquid-level controller communicating with a valve in said feed line and with a selected liquid level in an intermediate section of said column; means in said column for forcing discrete solid in a compact mass into the lower section of said column and bypassing liquor to the upper end thereof, said means comprising a hollow piston having a finely perforate screen extending across the hollow therein; take-off means in the upper end of said column for withdrawing by-passed liquor; a vapor take-off line opening into said column just above the level of said liquid level; a flow control means in said vapor take-off line; a temperature controller in communication with said flow control means and with the interior of said column just below the level of said liquid control level; and a product outlet in said heating and melting section.

3. Apparatus for the purification of solid material containing occluded impurities comprising in combination an upright elongated closed column; a heating and melting section in the lower end of said column for melting solid material therein; a reciprocable close-fitting piston in the upper section of said column having perforate means therein said piston being adapted for forcing discrete solid in a slurry toward said lower end while passing liquid in said slurry therethrough; a take-off line from said column above said piston; a feed line opening into said column at a point below said piston at its lowermost position; a liquid-level controller communicating with a valve in said feed line and with an area of said column intermediate the extreme piston positions; a vapor take-off line opening into said column at a level just above the liquid level control level; a flow control valve in said vapor take-off line; a temperature control element in communication with said flow control valve and with the interior of said column just below the level of said liquid control level; and a product take-off line in the lower end of said column.

4. The apparatus of claim 3 including a pressure-control valve in the take-off line from said column above said piston.

5. Apparatus for the purification of solid material containing occluded impurities comprising in combination an upright elongated closed column; a heating and melting section in the lower end of said column for melting solid material therein; a feed line leading into said column below the hereinafter-named liquid level and above said heating and melting section adapted for introducing a slurry of discrete solid thereto; a liquid-level controller communicating with a valve in said feed line and with a selected liquid level in an intermediate section of said column; a reciprocable piston in the upper section of said column adapted for forcing discrete solid toward the melting section and forming a compact mass of solid therein; filtering means in said piston for removing liquid from said slurry on motion of said piston; means for removing vapor at a controlled pressure from an area of said column just above said liquid level on the upstroke of said piston; a take-off line connecting with the upper end section of said column above said piston; and a product outlet in said melting section.

References Cited in the file of this patent

UNITED STATES PATENTS

| | | |
|---|---|---|
| 2,613,136 | McKay | Oct. 7, 1952 |
| 2,615,793 | Weedman | Oct. 28, 1952 |
| 2,615,794 | Shelby | Oct. 28, 1952 |
| 2,617,274 | Schmidt | Nov. 11, 1952 |